(12) United States Patent
Pandey et al.

(10) Patent No.: US 10,949,964 B2
(45) Date of Patent: Mar. 16, 2021

(54) SUPER-RESOLUTION DEFECT REVIEW IMAGE GENERATION THROUGH GENERATIVE ADVERSARIAL NETWORKS

(71) Applicant: KLA-Tencor Corporation, Milpitas, CA (US)

(72) Inventors: Anuj Pandey, Delhi (IN); Bradley Ries, San Jose, CA (US); Himanshu Vajaria, Milpitas, CA (US); Yong Zhang, Cupertino, CA (US); Rahul Lakhawat, Tamil Nadu (IN)

(73) Assignee: KLA Corporation, Milpitas, CA (US)

( * ) Notice: Subject to any disclaimer, the term of this patent is extended or adjusted under 35 U.S.C. 154(b) by 57 days.

(21) Appl. No.: 16/180,957

(22) Filed: Nov. 5, 2018

(65) Prior Publication Data

US 2020/0098101 A1    Mar. 26, 2020

Related U.S. Application Data

(60) Provisional application No. 62/755,224, filed on Nov. 2, 2018.

(30) Foreign Application Priority Data

Sep. 21, 2018  (IN) .............................. 201841035629

(51) Int. Cl.
  *G06T 7/00*   (2017.01)
  *G06T 3/40*   (2006.01)
  (Continued)

(52) U.S. Cl.
  CPC ........... *G06T 7/001* (2013.01); *G06N 3/0454* (2013.01); *G06N 3/088* (2013.01); *G06T 3/4046* (2013.01);
  (Continued)

(58) Field of Classification Search
  None
  See application file for complete search history.

(56) References Cited

U.S. PATENT DOCUMENTS 7,113,628 B1 *  9/2006  Obara ..................... G06T 7/001
                                                     356/237.1
8,284,394 B2   10/2012  Klrk et al.
                (Continued)

FOREIGN PATENT DOCUMENTS

CN    107767343 A    3/2018
KR    101836096 B1   3/2018

OTHER PUBLICATIONS

International Search Report dated Jan. 6, 2020 for PCT/US2019/052033.

*Primary Examiner* — Nancy Bitar
(74) *Attorney, Agent, or Firm* — Suiter Swantz pc llo

(57) ABSTRACT

A system for analyzing a sample includes an inspection sub-system and at least one controller. The inspection sub-system is configured to scan a sample to collect a first plurality of sample images having a first image resolution. The controller is configured to generate a defect list based on the first plurality of sample images. The controller is further configured to input images corresponding to the defect list into a neural network that is trained with source data including sample images having the first image resolution and sample images having a second image resolution higher than the first image resolution. The controller is further configured to generate a second plurality of sample images with the neural network based on the images corresponding to the defect list, where the second plurality of sample images have the second image resolution and correspond to the defect list.

12 Claims, 7 Drawing Sheets

(51) Int. Cl.
*G06N 3/08* (2006.01)
*G06N 3/04* (2006.01)

(52) U.S. Cl.
CPC .. *G06T 3/4053* (2013.01); *G06T 2207/10024* (2013.01); *G06T 2207/20084* (2013.01); *G06T 2207/30148* (2013.01)

(56) References Cited

U.S. PATENT DOCUMENTS

| | | | |
|---|---|---|---|
| 10,783,637 B2* | 9/2020 | Li | G16H 50/20 |
| 2008/0304056 A1* | 12/2008 | Alles | G03F 1/84 |
| | | | 356/237.5 |
| 2017/0193680 A1* | 7/2017 | Zhang | G01N 21/9501 |
| 2017/0345140 A1 | 11/2017 | Zhang et al. | |
| 2017/0357895 A1 | 12/2017 | Karlinsky et al. | |
| 2019/0138838 A1* | 5/2019 | Liu | G06T 5/002 |

* cited by examiner

SUPER-RESOLUTION DEFECT REVIEW IMAGE GENERATION THROUGH GENERATIVE ADVERSARIAL NETWORKS

CROSS-REFERENCE TO RELATED APPLICATIONS

The present application claims priority to India Provisional Patent Application No. 201841035629, filed Sep. 21, 2018, entitled SUPER-RESOLUTION DEFECT REVIEW IMAGE GENERATION THROUGH GENERATIVE ADVERSARIAL NETWORKS, and naming Anuj Pandey, Brad Ries, Himanshu Vajaria, Yong Zhang, and Rahul Lakhawat as inventors, which is incorporated herein by reference in its entirety. The present application also claims priority to U.S. Provisional Patent Application No. 62/755,224, filed Nov. 2, 2018, entitled SUPER RESOLUTION DEFECT REVIEW IMAGE GENERATION THROUGH GENERATIVE ADVERSARIAL NETWORKS, and naming Anuj Pandey, Brad Ries, Himanshu Vajaria, Yong Zhang, and Rahul Lakhawat as inventors, which is incorporated herein by reference in its entirety.

TECHNICAL FIELD

The present disclosure relates generally to systems and methods for sample analysis and more particularly to systems and methods for defect inspection and review.

BACKGROUND

Sample analysis systems (e.g., inspection systems) are being designed to perform defect inspection at faster rates. For a typical patterned wafer, a job run may include the following steps: (1) Wafer Loading on pre-aligner; (2) Notch alignment; (3) Wafer Loading on chuck; (4) Wafer Alignment; (5) Defect Scan; (6) Defect Filtering; (7) Automatic/Automated Defect Review (ADR); and (8) Wafer Unloading followed by saving the defect images (and reference images, if any). In this process, the throughput is mostly impacted by defect scan and ADR steps.

In existing ADR schemes, an inspection system/tool, after the inspection scan, switches to the review objective and then goes to each of the defect locations, acquires focus and grabs an image. At times, when the wafer Z-profile is not flat, review may even experience defocus. Some disadvantages of the current ADR process are that longer time is required for ADR (to collect higher resolution images at each of the defect locations), defocus issues may occur due to irregular wafer flatness profile, and there is a risk of physical contact of the review objective with the wafer. Accordingly, there is a need for sample analysis systems and methods with improved ADR schemes.

SUMMARY

A system for analyzing a sample is disclosed in accordance with one or more illustrative embodiments of the present disclosure. In one illustrative embodiment, the system includes an inspection sub-system and a controller. In embodiments, the inspection sub-system is configured to scan a sample to collect a first plurality of sample images having a first image resolution. In embodiments, the controller is configured to generate a defect list based on the first plurality of sample images. In embodiments, the controller is further configured to input images corresponding to the defect list into a neural network that is trained with source data including sample images having the first image resolution and sample images having a second image resolution higher than the first image resolution. In embodiments, the controller is further configured to generate a second plurality of sample images with the neural network based on the images corresponding to the defect list, where the second plurality of sample images have the second image resolution and correspond to the defect list.

A method for analyzing a sample is also disclosed in accordance with one or more illustrative implementations of the present disclosure. In one illustrative implementation of the method, the sample is scanned to collect a first plurality of sample images having a first image resolution. In implementations, a defect list is generated based on the first plurality of sample images. In implementations, images corresponding to the defect list are fed into a neural network that has been trained with source data including sample images having the first image resolution and sample images having a second image resolution higher than the first image resolution. In implementations, a second plurality of sample images are generated by the neural network based on the images corresponding to the defect list, where the second plurality of sample images have the second image resolution and correspond to the defect list.

A controller for a sample analysis system is also disclosed in accordance with one or more illustrative embodiments of the present disclosure. In one illustrative embodiment, the controller includes at least one processor and at least one memory medium communicatively coupled to the processor. In embodiments, the memory medium includes program instructions that are executable by the at least one processor and configured to cause the processor to: generate a defect list based on a first plurality of sample images having a first image resolution; input images corresponding to the defect list into a neural network, the neural network being trained with source data including sample images having the first image resolution and sample images having a second image resolution higher than the first image resolution; and generate a second plurality of sample images with the neural network based on the images corresponding to the defect list, the second plurality of sample images having the second image resolution and corresponding to the defect list.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Figure 1:
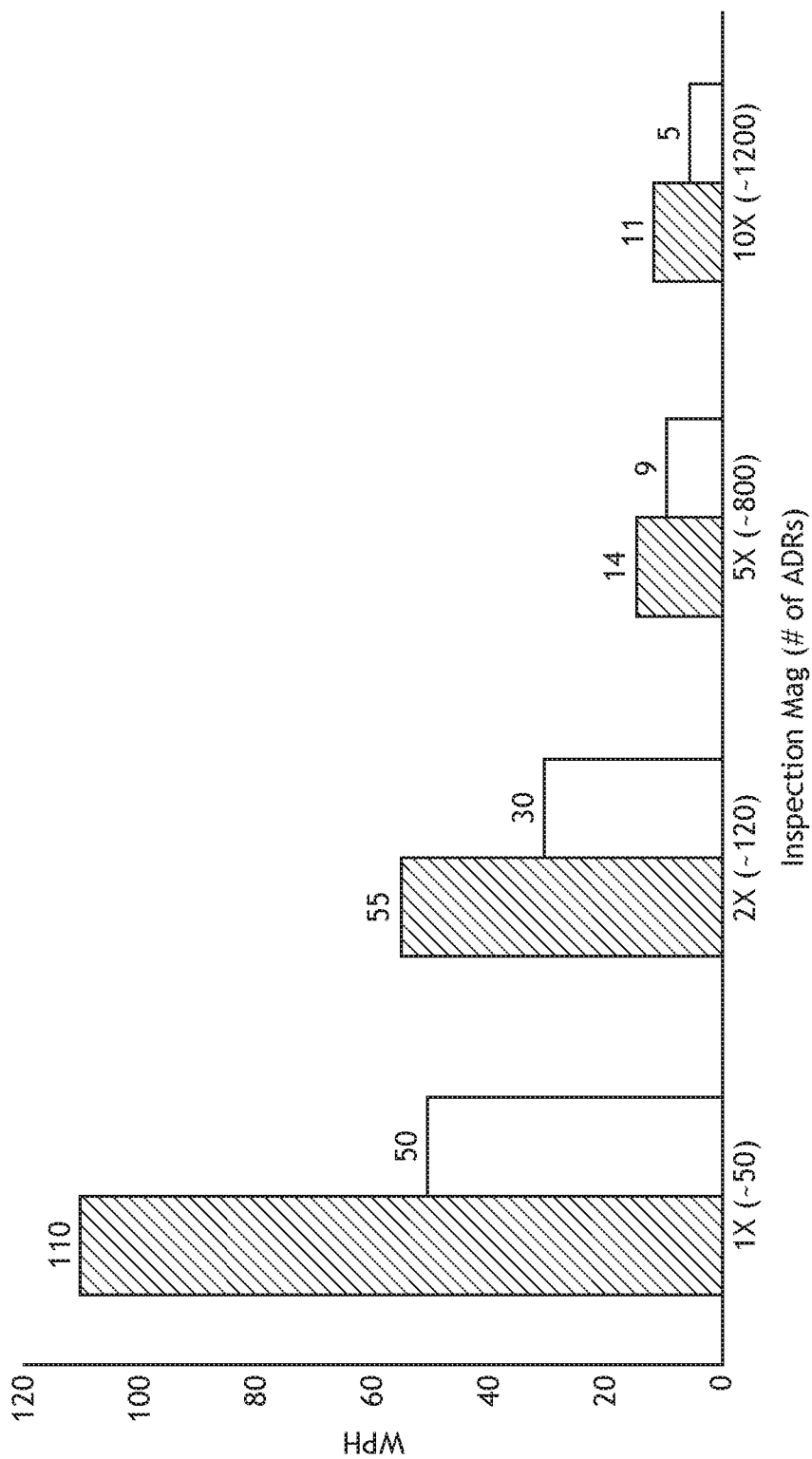
FIG. 1 is a chart that illustrates an example of the tool throughput for an inspection system at different scan resolutions (objective magnifications) with and without ADR.

In a typical production scenario, a customer may review somewhere between 100-1500 defects depending on wafer defectivity and inspection nuisance rate. As a result, the inspection tool/system needs to spend a lot of time on ADR to grab review images. Throughput is inversely proportional to the number of images being reviewed. That is, the higher the number of ADR review images, the lower the throughput. FIG. 1 shows a chart with an example of the throughput numbers for different objectives with the number of ADR image captures indicated in brackets. As can be seen from the chart in FIG. 1, ADR has a significant impact on throughput.

For a patterned wafer, a job run may include the following steps: (1) Wafer Loading on pre-aligner; (2) Notch alignment; (3) Wafer Loading on chuck; (4) Wafer Alignment; (5) Defect Scan; (6) Defect Filtering; (7) Automatic/Automated Defect Review (ADR); and (8) Wafer Unloading followed by saving the defect images (and reference images, if any). In this process, the throughput is mostly impacted by defect scan and ADR steps.

In existing ADR schemes, an inspection system/tool, after the inspection scan, switches to the review objective and then goes to each of the defect locations, acquires focus and grabs an image. At times, when the wafer Z-profile is not flat, review may even experience defocus. Some disadvantages of the current ADR process are that longer time is required for ADR (to collect higher resolution images at each of the defect locations), defocus issues may occur due to irregular wafer flatness profile, and there is a risk of physical contact of the review objective with the wafer.

To reduce the impact of ADR on throughput, a system and method that employ a neural network to generate high/super-resolution images based on lower resolution scan images (e.g., patch clips) are disclosed. For example, the system and method disclosed herein can be used to generate colored, high resolution defect review images by feeding grayscale defect patch images to a generative network trained by deep learning methods. In embodiments, a generative deep learning neural network is trained with scan images and ADR images during recipe setup. Then, during a job run, scan images are collected and fed into the neural network to generate high resolution ADR images. By using the trained neural network to generate ADR images during a job run, rather than having to collect high resolution ADR images: (1) ADR time is reduced (thereby improving throughput); (2) ADR defocus issues are eliminated; and (3) there is no risk of wafer damage by the review objective during the job run.

Figure 2A:
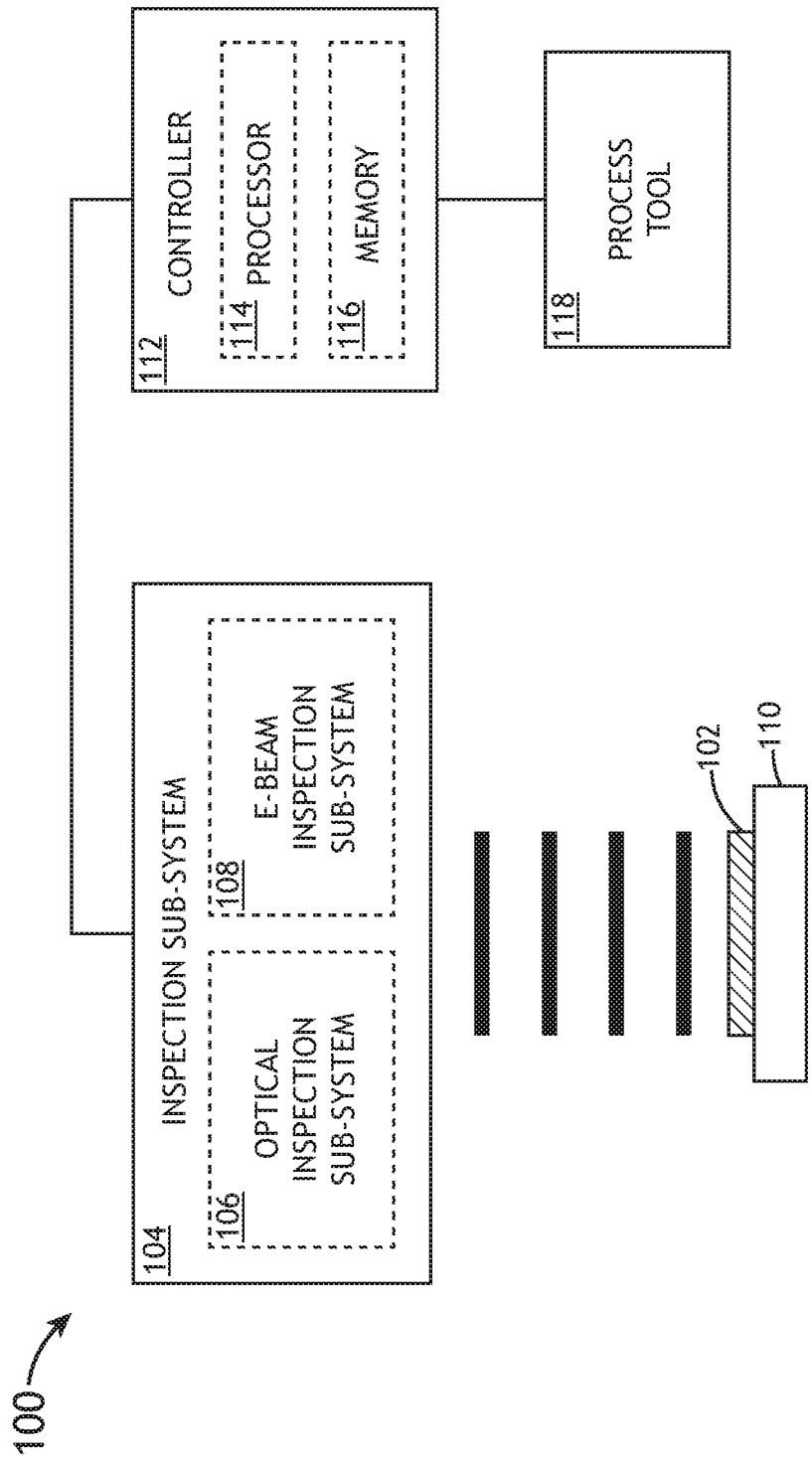
FIG. 2A is a schematic illustration of a system for analyzing a sample, in accordance with one or more embodiments of the present disclosure.

FIG. 2 illustrates an example embodiment of a sample analysis system 100 that employs a neural network to generate high/super-resolution images based on lower resolution scan images (e.g., patch clips). The system 100 can be used to analyze at least one surface of a sample 102 (e.g., a wafer, board, panel, reticle, or any other substrate). In embodiments, the system includes an inspection sub-system 104, for example, an optical inspection sub-system 106 (e.g., a broadband plasma inspection sub-system, laser sustained plasma inspection sub-system, KLA-Tencor Corporation's 89xx series (e.g., 8900) series inspection sub-systems, or the like) and/or an electron beam (eBeam) inspection sub-system 108 (e.g., KLA-Tencor Corporation's eSLxx series eBeam wafer defect inspection platform, or the like).

The sample 102 is supported by one or more support members 110. For example, the one or more support members 110 may include one or more sample stages, chucks, or the like. In some embodiments, the one or more support members 110 may be actuatable (e.g., to adjust the x, y, or z coordinates of the sample 102). The one or more support members 110 may be configured to support the sample 102 at a selected position and/or orientation during analysis (e.g., inspection).

In embodiments, the system 100 further includes a controller 112 communicatively coupled to the inspection sub-system 104. For example, the controller 112 (or a plurality of controllers 112) can be communicatively coupled to an optical inspection sub-system 106 and/or an eBeam inspection sub-system 108. In some embodiments, the controller 112 includes one or more processors 114 configured to execute program instructions maintained on a memory medium 116. In this regard, the one or more processors 114 of controller 112 may execute any of the various process steps or operations described throughout the present disclosure.

The one or more processors 114 of a controller 112 may include any processing element known in the art. In this sense, the one or more processors 114 may include any microprocessor-type device configured to execute algorithms and/or instructions. In one embodiment, the one or more processors 114 may comprise a desktop computer, mainframe computer system, workstation, image computer, parallel processor, or any other computer system (e.g., networked computer) configured to execute a program configured to operate the system 100/inspection sub-system 104, as described throughout the present disclosure. It is further recognized that the term "processor" may be broadly defined to encompass any device having one or more processing elements, which execute program instructions from a non-transitory memory medium 116.

The memory medium 116 may include any storage medium known in the art suitable for storing program instructions executable by the associated one or more processors 114. For example, the memory medium 116 may include a non-transitory memory medium. By way of another example, the memory medium 116 may include, but is not limited to, a read-only memory, a random-access memory, a magnetic or optical memory device (e.g., disk), a magnetic tape, a solid-state disk/drive, or the like. It is further noted that memory medium 116 may be housed in a common controller housing with the one or more processors 114. In one embodiment, the memory medium 116 may be located remotely with respect to the physical location of the one or more processors 114 and controller 112. For instance, the one or more processors 114 of controller 112 may access a remote memory (e.g., server), accessible through a network (e.g., internet, intranet and the like). Therefore, the above description should not be interpreted as a limitation on the present invention but merely an illustration.

In embodiments, the controller 112 is configured to communicate with the inspection sub-system 104 (e.g., optical inspection sub-system 106 and/or eBeam inspection sub-system 108). For example, the controller 112 can be configured to receive data from or send data to the inspection sub-system 104 (e.g., optical inspection sub-system 106 and/or eBeam inspection sub-system 108). The controller 112 can be configured to receive any combination of raw data, processed data, and/or partially-processed data. For example, the controller 112 may be configured to receive inspection data, such as scan images, ADR images, and the like.

In embodiments, the controller 112 may be further configured to communicate with a process tool 118. For example, the controller 112 can be configured to receive data from or send data to the process tool 118. The controller 112 can be configured to receive any combination of raw data, processed data, and/or partially-processed data. For example, the controller 112 may be configured to receive process tool parameters/settings, batch information, activity logs, diagnostic information, and the like. The process tool 118 may comprise a lithography tool, an etch tool, a chemical-mechanical polishing (CMP) tool, a deposition tool (e.g., a chemical vapor deposition (CVD) tool, a physical vapor deposition (PVD) tool, an atomic layer deposition tool, etc.), a cleaning tool, a plating tool, an ion implantation tool, a thermal tool (e.g., a rapid thermal annealing tool), or the like. Some other examples of process tools (e.g., process equipment) are discussed in U.S. Pat. No. 8,284,394. Additional examples of inspection/metrology tools are also discussed in U.S. Pat. No. 8,284,394. U.S. Pat. No. 8,284,394 is incorporated herein by references in its entirety, and it is noted that, in some embodiments, the inspection sub-system 104, optical metrology system 106, and/or process tool 118 may comprise any of the respective inspection systems, metrology tools, or process equipment disclosed in U.S. Pat. No. 8,284,394.

The controller 112 can be further configured to send data and/or control signals to the inspection sub-system 104 (e.g., optical inspection sub-system 106 and/or eBeam inspection sub-system 108) and/or process tool 118. In some embodiments, the controller 112 may be configured to control one or more operating parameters of the inspection sub-system 104 (e.g., optical inspection sub-system 106 and/or eBeam inspection sub-system 108) and/or process tool 118. For example, the controller 112 may be configured to control one or more illumination parameters (e.g., illumination intensity, wavelength, bandwidth, frequency, spot size, etc.), scan pattern, scan speed, optical parameters (e.g., focus, relative lens positions, aperture size, filter arrangements, lens arrangements, etc.), process tool parameters (e.g., spatial, timing, and/or material deposition parameters), and so forth.

Further, the steps described throughout the present disclosure may be carried out by a single controller 112 or, alternatively, multiple controllers. Additionally, the controller 112 may include one or more controllers housed in a common housing or within multiple housings. In this way, any controller or combination of controllers may be separately packaged as a module suitable for integration into the system 100. For instance, the controller 112 may operate as a centralized processing platform for the inspection sub-system 104 (e.g., optical inspection sub-system 106 and/or eBeam inspection sub-system 108) and/or process tool 118 and may implement one or more analysis (e.g., inspection) algorithms to received data (raw and/or partially-processed) to detect and/or review sample defects and/or generate control parameters (e.g., process tool parameters) based on collected data.

Figure 2B:
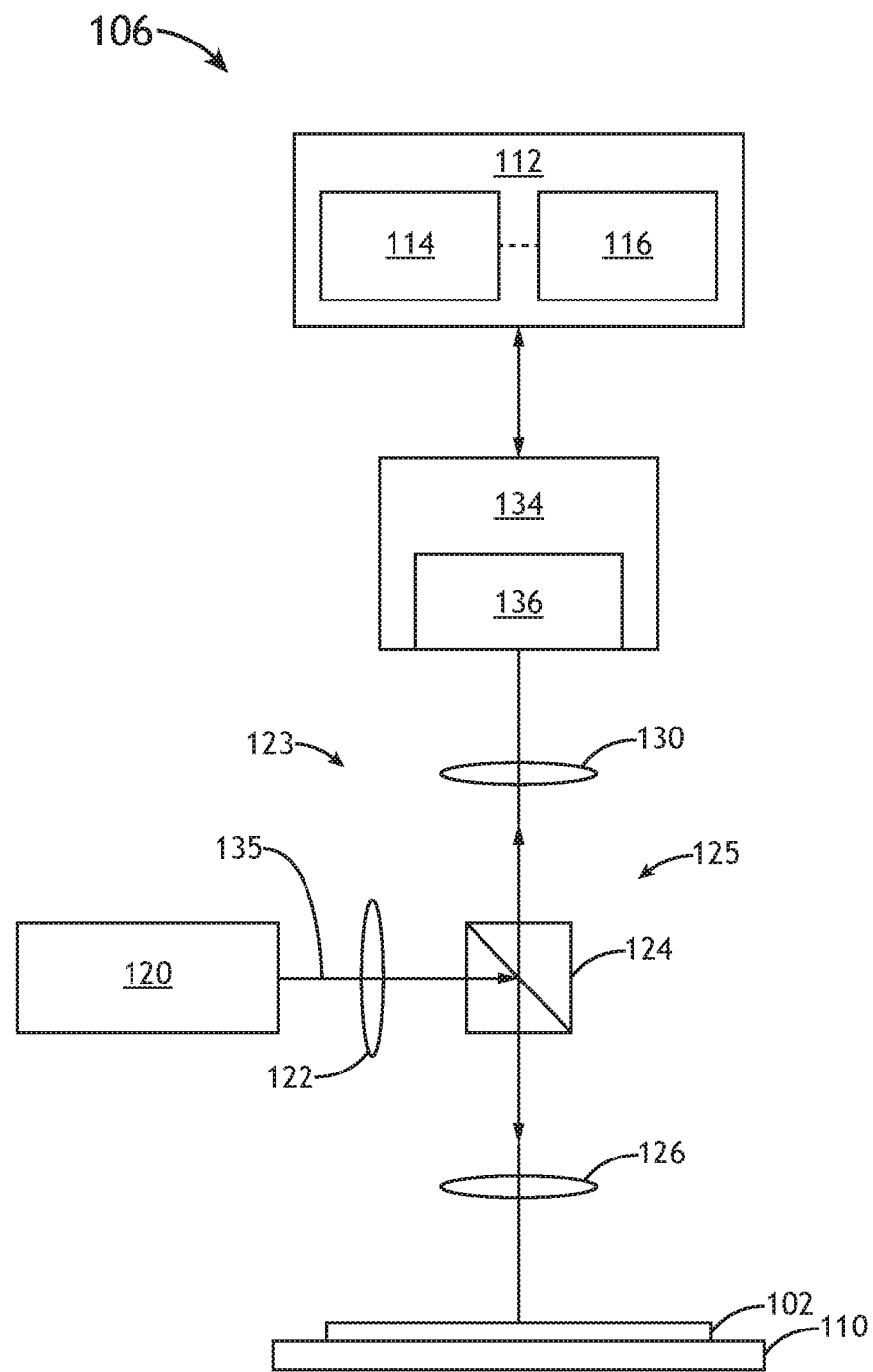
FIG. 2B is a schematic illustration of an optical inspection sub-system, in accordance with one or more embodiments of the present disclosure.

In some embodiments, the inspection sub-system 104 comprises an optical inspection sub-system 106, such as the inspection sub-system 106 illustrated in FIG. 2B. FIG. 2B illustrates a simplified schematic view of an optical inspection sub-system 104, in accordance with one or more embodiments of the present disclosure. In one embodiment, system 104 includes an illumination source 120 (e.g., a broadband or narrowband illumination source), an illumination arm 123, a collection arm 125, and a detector assembly 134.

The sample 102 may be disposed on a stage assembly 110 to facilitate movement of sample 102. The stage assembly 110 may include any stage assembly 110 known in the art including, but not limited to, an X-Y stage, an R-θ stage, and the like. In some embodiments, stage assembly 110 is capable of adjusting the height of sample 102 during inspection or imaging to maintain focus on the sample 102.

The illumination arm 123 can be configured to direct illumination 135 from the Illumination source 120 to the sample 102. The illumination arm 123 may include any number and type of optical components known in the art. In some embodiments, the illumination arm 123 includes one or more optical elements 122, a beam splitter 124, and an objective lens 126. In this regard, illumination arm 123 may be configured to focus illumination 135 from the Illumination source 120 onto the surface of the sample 102. The one or more optical elements 122 may include any optical element or combination of optical elements known in the art including, but not limited to, one or more mirrors, one or more lenses, one or more polarizers, one or more gratings, one or more filters, one or more beam splitters, and the like.

The collection arm 125 can be configured to collect light reflected, scattered, diffracted, and/or emitted from sample 102. In some embodiments, the collection arm 125 may direct and/or focus the light from the sample 102 to a sensor 136 of a detector assembly 134. It is noted that sensor 136 and detector assembly 134 may include any sensor and detector assembly known in the art. The sensor 136 may include, but is not limited to, a charge-coupled device (CCD) detector, a complementary metal-oxide semiconductor (CMOS) detector, a time-delay integration (TDI) detector, a photomultiplier tube (PMT), an avalanche photodiode (APD), and the like. Further, sensor 136 may include, but is not limited to, a line sensor or an electron-bombarded line sensor.

The detector assembly 134 may be communicatively coupled to the controller 112 including one or more processors 114 and memory 116. For example, the one or more processors 114 may be communicatively coupled to memory 116, wherein the one or more processors 114 are configured to execute a set of program instructions stored on memory 116. In embodiments, the one or more processors 114 are configured to analyze the output of detector assembly 134. In some embodiments, the set of program instructions are configured to cause the one or more processors 114 to analyze one or more characteristics of sample 102. In some embodiments, the set of program instructions are configured to cause the one or more processors 114 to modify one or more characteristics of system 104 in order to maintain focus on the sample 102 and/or the sensor 136. For example, the one or more processors 114 may be configured to adjust the objective lens 126 or one or more optical elements 122 in order to focus illumination 135 from Illumination source 120 onto the surface of the sample 102. By way of another example, the one or more processors 114 may be configured to adjust the objective lens 126 and/or one or more optical elements 130 in order to collect illumination from the surface of the sample 102 and focus the collected illumination on the sensor 136.

It is noted that the system 104 may be configured in any optical configuration known in the art including, but not limited to, a dark-field configuration, a bright-field orientation, and the like. It is further noted that one or more components of system 100 may be communicatively coupled to the various other components of system 100 in any manner known in the art. For example, the Illumination source 120, detector assembly 134, controller 112, and one or more processors 114 may be communicatively coupled to each other and other components via a wireline (e.g., copper wire, fiber optic cable, and the like) or wireless connection (e.g., RF coupling, IR coupling, data network communication (e.g., WiFi, WiMax, Bluetooth and the like).

In embodiments, the inspection sub-system 104 is configured to perform a scan on the sample 102 to collect a first plurality of sample images (sometimes referred to herein as "scan images" or "patch clips") having a first image resolution. In some embodiments, sample images having the first image resolution are captured at an objective magnification in the range of 1× to 10×. The inspection sub-system 104 can collect scan images/patch clips at a much faster rate than ADR images that may have two or more times the resolution of the scan images/patch clips. For example, the ADR images may have a second image resolution that is higher than the first image resolution (e.g., 2 to 5 times the first image resolution, or higher). In some embodiments, the scan images/patch clips are black and white (B&W) or grayscale images, while the ADR images are higher resolution color images.

The controller 112 can be configured to generate a defect list based on the scan images/patch clips detected by the inspection sub-system 104. Then, rather than causing the inspection sub-system 104 to collect ADR images at defect locations indicated by the defect list, the controller 112 is configured to input the scan images/patch clips that correspond to the defect list into a neural network (e.g., neural network 200, which is described below, or the like). For example, the controller 112 can be configured to load the defect list and all the scan images/patch clips into the neural network, or alternatively configured to load a subset of the scan images/patch clips that corresponds to the defect list into the neural network. The controller 112 is then configured to generate ADR images with the neural network based on the scan images/patch clips that correspond to the defect list.

Figure 3A:
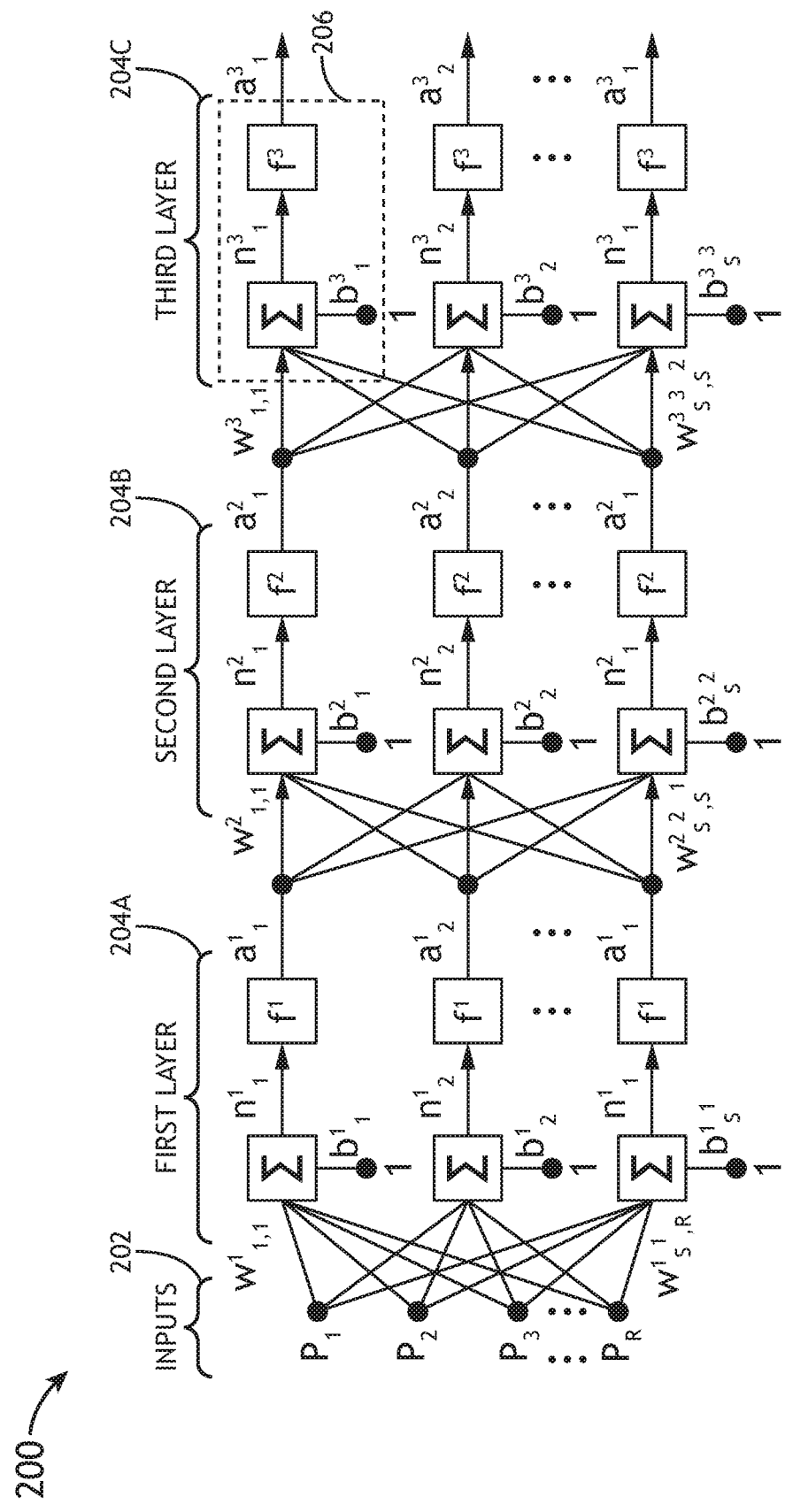
FIG. 3A is a schematic illustration of a neural network, in accordance with one or more embodiments of the present disclosure.
Figure 3B:
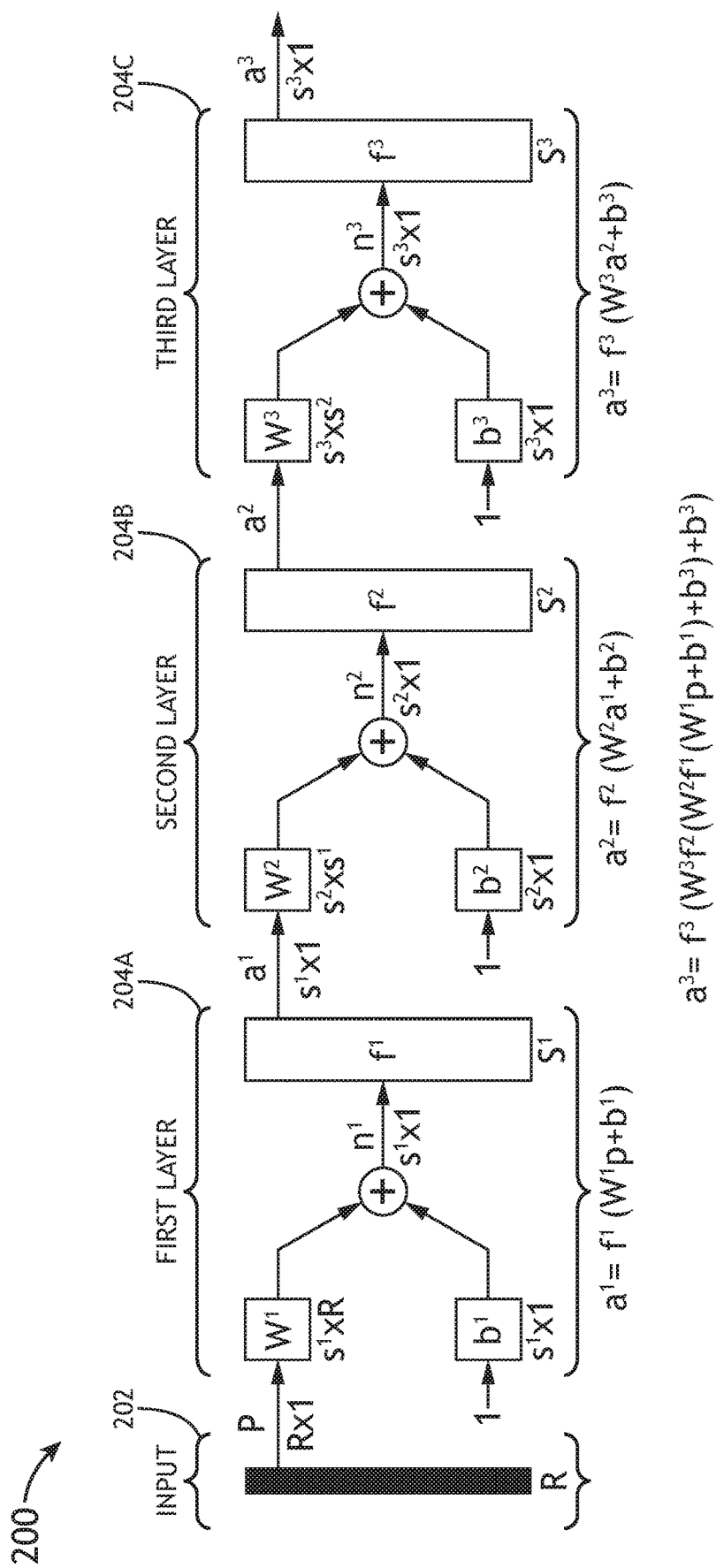
FIG. 3B is a simplified schematic illustration of the neural network illustrated in FIG. 3A, shown in matrix notation, in accordance with one or more embodiments of the present disclosure.
Figure 3C:
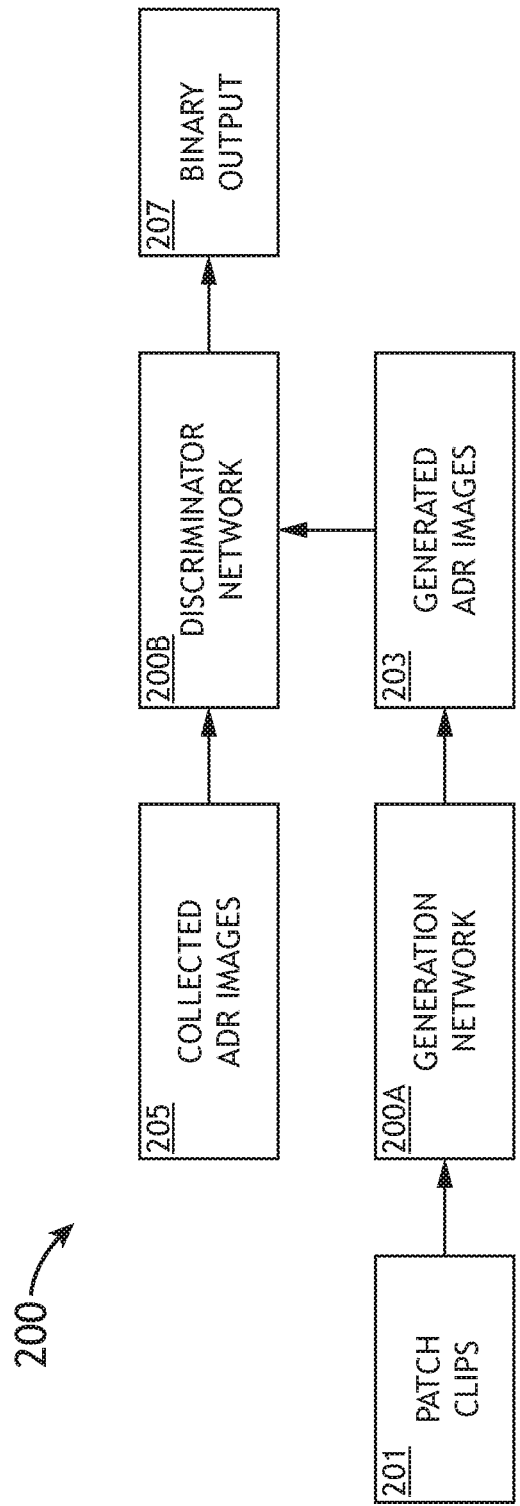
FIG. 3C is a schematic illustration of a neural network in a generative adversarial network (GAN) configuration, in accordance with one or more embodiments of the present disclosure.

FIGS. 3A through 3C illustrate a neural network 200, in accordance with one or more embodiments of this disclosure. The neural network 200 can be implemented by software modules executed by the processor 114 (e.g., from memory 116). In other embodiments, the neural network 200 can be implemented by hardware modules (e.g., integrated circuits, programmable logic devices, etc.) or a combination of hardware and software modules.

In embodiments, the neural network 200 may include one or more layers. For example, a multi-layered neural network 200 is illustrated in FIGS. 3A and 3B. Such neural network topology/architecture can be employed for a multiple-input and multiple-output (MIMO) system. The neural network 200 includes one or more inputs 202 and one or more layers 204 (e.g., a first layer 204A, a second layer 204B, a third layer 204C, and so on). In embodiments, the neural network 200 can include any number of inputs and layers. Each of the layers 204 includes one or more neurons/perceptrons 206. A neuron/perceptron 206 may have the following attributes: (1) a scalar weight, such as $w_{1,1}{}^3$; (2) a scalar bias, such as $b_1{}^3$; (3) a summation operation, such as $\Sigma$; (4) a transfer function (or activation function), such as $f^3$; and a scalar output, such as a. A scalar input to a neuron/perceptron 206 is multiplied by the weight of the neuron/perceptron 206, and then summed with its bias before being transformed by its transfer function to become its output. As shown in FIG. 3B, the mathematical notions for the neural network 200 may be represented in a matrix format.

As shown in FIG. 3C, in embodiments, the neural network 200 may be a generative adversarial network (GAN). In this regard, the neural network 200 may include a first neural network (the generation network) 200A configured to generate ADR images 203 based on scan images/patch clips 201 and a second neural network (the discriminator network) 200B configured to generate a binary output 207 (e.g., true/false, correct/incorrect, I/O) based on image authenticity parameters trained with ADR images 205 collected by the inspection sub-system 104. The discriminator network 200B can be configured to generate a false/incorrect/0 state at the binary output 207 when a generated ADR image 203 does not satisfy the trained parameters. In turn, the generation network 200A can be configured to adjust its weights and biases so that the generated ADR images 203 satisfy the trained parameters of the discriminator network 200B to result in true/correct/1 states at the binary output 207.

In embodiments, the neural network 200 is trained by performing this process a number of times with source data including scan images/patch clips 201 (at low resolution) and ADR images 205 collected by the inspection sub-system 104 (at high resolution). For example, the neural network 200 may be trained with a predetermined number of scan images/patch clips 201 and a predetermined number of collected ADR images 205 (e.g., 500 to 5000 scan images/patch clips and 500 to 5000 collected ADR images). In other embodiments, the neural network 200 may continue training until the discriminator network 200B outputs a threshold number of consecutive true/correct/1 states or a threshold ratio of true/correct/1 states relative to false/incorrect/0 states at the binary output 207. For example, the neural network 200 may be trained until a threshold confidence level (e.g., at least 70%, 80%, 90%, or more) is achieved for a predetermined number of inputs. At this point, the generation network 200A is trained to generate high resolution ADR images 203 of acceptable quality. It is noted that the number of scan images/patch clips 201 and/or collected ADR images 205 used to train the neural network 200 and the threshold confidence level can vary depending on system requirements. Accordingly, the foregoing numerical values are to be understood as non-limiting examples unless otherwise provided in the claims.

Figure 4:
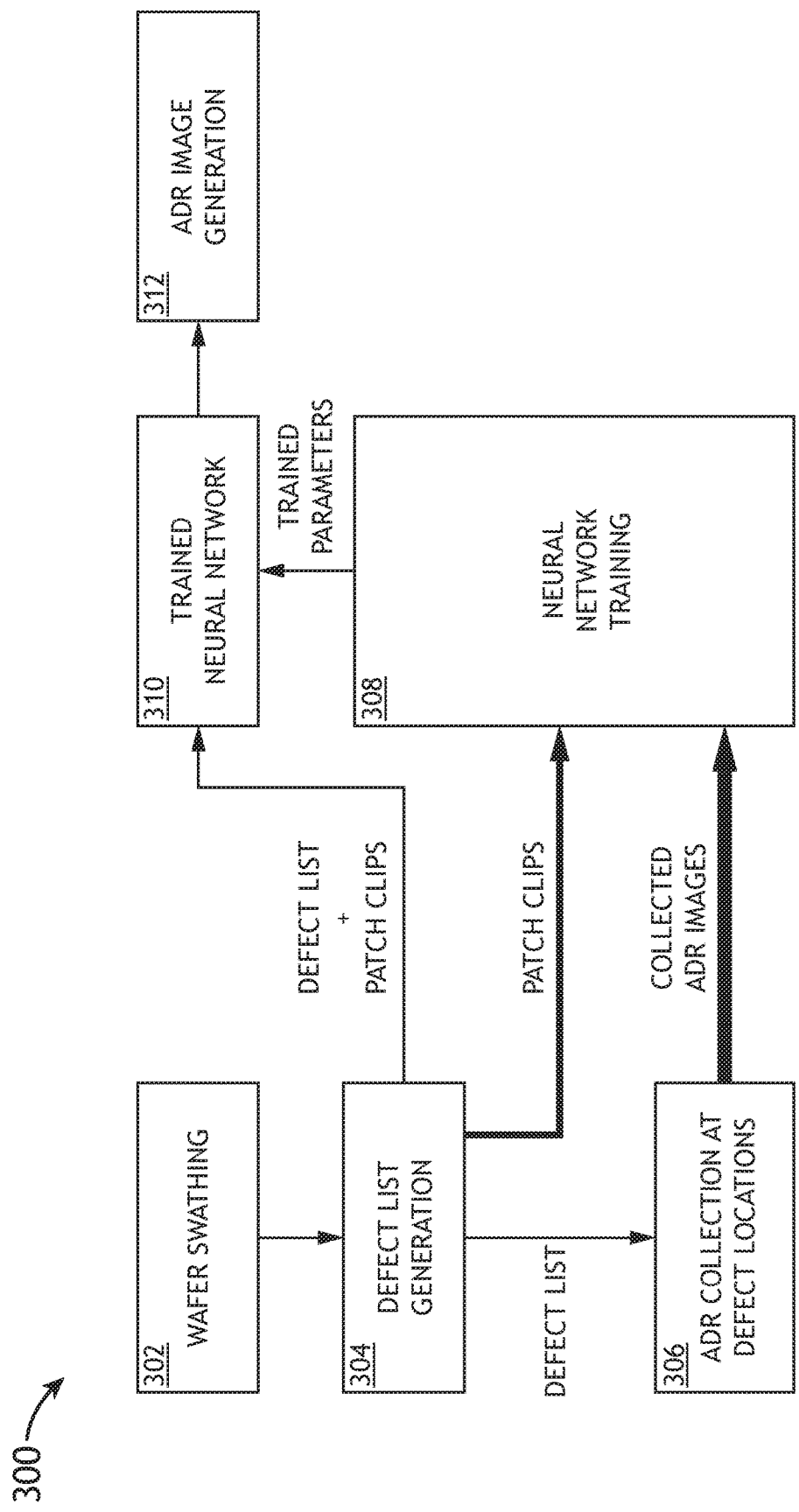
FIG. 4 is a flow diagram that illustrates a method for analyzing a sample, in accordance with one or more implementations of the present disclosure.

FIG. 4 is a flow diagram illustrating a method 300 that employs a neural network (e.g., neural network 200) to generate ADR images (e.g., ADR images 203) for sample defect inspection and review, in accordance with one or more embodiments of the present disclosure. Embodiments and enabling technologies described previously herein in the context of system 100 should be interpreted to extend to method 300. It is further noted, however, that the method 300 is not limited to the architecture of system 100.

At step 302, the method 300 includes scanning a sample 102 to collect a first plurality of sample images having a first image resolution. For example, the inspection sub-system 104 can be configured to scan the sample at the first resolution (e.g., wafer swathing) to collect scan images/patch clips 201 having the first image resolution. In some embodiments, the sample images having the first image resolution are captured at an objective magnification in the range of 1× to 10×. In some embodiments, the scan images/patch clips 201 are B&W or grayscale images.

At step 304, the method 300 includes generating a defect list based on the first plurality of sample images (e.g., the scan images/patch clips 201). For example, the controller 112 can be configured to generate a defect list based on the scan images/patch clips 201 by applying image or pattern recognition algorithms, spectral analysis, brightfield/darkfield imaging, or the like. In implementations, the defect list may include coordinates of identified defects or regions of interest (ROI).

At step 310, the method 300 includes inputting images (e.g., scan images/patch clips 201) corresponding to the defect list into a trained neural network (e.g., neural network 200). For example, the controller 112 can be configured to input the scan images/patch clips 201 corresponding to the defect list into the trained neural network 200. In some embodiments, the defect list itself is also an input to the neural network 200. In other embodiments, the controller 112 is configured to input the scan images/patch clips 201 that correspond to the defect coordinates identified by the defect list into the neural network 200. The neural network 200 may be trained with source data including sample images (e.g., scan images/patch clips 201) having the first image resolution and sample images (e.g., collected ADR images 205) having a second image resolution higher than the first image resolution. An example implementation of a process for training the neural network 200 is described below with reference to steps 306 and 308.

At step 312, the method includes generating a second plurality of sample images (e.g., generated ADR images 203) with the neural network (e.g., neural network 200) based on the images corresponding to the defect list (e.g., the scan images/patch clips 201). The generated ADR images 203 may be similar to collected ADR images 205 in the sense that the generated ADR images 203 may have an image resolution in the same range (e.g., 2 to 5 times the first image resolution, or higher) as ADR images 205 collected by the inspection sub-system 104. However, the generated ADR images 203 can be obtained more quickly and are not prone to mechanical errors (e.g., wafer damage) that can occur when collecting ADR images 205 with the inspection sub-system 104. This is because the generated ADR images 203 do not require the use of an objective lens to obtain 20× to 50×, or higher magnification. Instead, the high-resolution ADR images 203 are generated by the trained neural network (e.g., neural network 200) based on the scan images/patch clips 201 which may be collected at a 1× to 10× objective magnification. It is noted that the resolution/magnification values or ranges are provided as examples and are not intended as limitations, unless otherwise provided in the claims. In general, the neural network 200 can be configured to output ADR images 203 that are colored renderings and/or higher resolution than the scan images/patch clips 201.

In implementations, the method 300 includes a training process that can be executed prior to generating ADR images (e.g., ADR images 203) during a job run. For example, the method 300 can include performing steps 302 through 308 one or more times before performing steps 302, 304, 310, and 312 during a job run. In some implementations, the method 300 includes performing the training process periodically, on demand, and/or when errors are encountered. For example, the training process may be performed when an input (e.g., scan image/patch clip 201) cannot be resolved by the generation network 200A or when the input results in a false/incorrect/0 state binary output 207 by the discriminator network 200B. In another example implementation, the training process may be performed after a number of samples (e.g., every $10^{th}$ sample, every $100^{th}$ sample, or the like). In another example implementations, the training process may be performed in response to a user input (e.g., a user command to retrain the neural network 200).

In implementations of the method 300, the training process includes steps 302 and 304 of scanning one or more samples (e.g., wafer swathing) to scan images/patch clips 201 and generating a defect list based on the scan images/patch clips 201. At step 306, the training process further includes performing ADR at defect locations on the one or more samples to collect sample images (e.g., collected ADR images 205) having the second image resolution. At step 308, the neural network 200 is trained based on the source data including scan images/patch clips 201 and the collected ADR images 205. In some implementations, the neural network 200 is trained by performing this process a number of times with source data including scan images/patch clips 201 (at low resolution) and ADR images 205 collected by the inspection sub-system 104 (at high resolution). For example, the neural network 200 may be trained with a predetermined number of scan images/patch clips 201 and a predetermined number of collected ADR images 205 (e.g., 500 to 5000 scan images/patch clips and 500 to 5000 collected ADR images). In other implementations, the neural network 200 may continue training until the discriminator network 200B outputs a threshold number of consecutive true/correct/1 states or a threshold ratio of true/correct/1 states relative to false/incorrect/0 states at the binary output 207. For example, the neural network 200 may be trained until a threshold confidence level (e.g., at least 70%, 80%, 90%, or more) is achieved for a predetermined number of inputs.

As previously mentioned, in some implementations, the neural network 200 may be retrained when an input (e.g., scan image/patch clip 201) cannot be resolved by the generation network 200A or when the input results in a false/incorrect/0 state binary output 207 by the discriminator network 200B, or is otherwise invalid. For example, the controller 112 can be configured to cause the inspection sub-system 104 to perform ADR at an identified defect location on the sample to collect a second sample image (e.g., an ADR image 205) having the second image resolution when a first sample image (e.g., scan image/patch clip 201) having the first image resolution and corresponding to the identified defect location is an invalid input to the neural network 200 (e.g., as performed in step 306). The collected ADR image can be used instead of a generated ADR image when the scan image/patch clip that is input to the neural network 200 is deemed invalid. In addition, or alternatively, the method 300 may include retraining the neural network 200 based on the scan image/patch clip that is deemed invalid and the collected ADR image. In this manner, the neural network 200 can continue to train over time so that a broader range of defect types and image resolutions can be resolved by the neural network 200 and used to generate acceptable ADR images.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A system for analyzing a sample, comprising:
   an inspection sub-system configured to scan one or more samples to collect a first plurality of sample images having a first image resolution; and
   at least one controller configured to:
      generate a defect list based on the first plurality of sample images;
      input images corresponding to the defect list into a neural network, the neural network being trained with source data including sample images having the first image resolution and sample images having a second image resolution higher than the first image resolution;
      generate a second plurality of sample images with the neural network based on the images corresponding to the defect list, the second plurality of sample images having the second image resolution and corresponding to the defect list;
      cause the inspection sub-system to perform automatic defect review at defect locations on the one or more samples to collect the sample images having the second image resolution, wherein the defect locations are identified based on the sample images having the first image resolution;
      train the neural network based on the source data including the sample images having the first image resolution and the sample images having the second image resolution;
      cause the inspection sub-system to perform automatic defect review at an identified defect location on the sample to collect a second sample image having the second image resolution when a first sample image having the first image resolution and corresponding to the identified defect location is an invalid input to the neural network; and
      retrain the neural network based on the first sample image having the first image resolution and the second sample image having the second image resolution.

2. The system of claim 1, wherein the second image resolution is 2 to 5 times the first image resolution.

3. The system of claim 1, wherein the first plurality of sample images are grayscale images, and the second plurality of images are color images.

4. The system of claim 1, wherein the neural network comprises a generative adversarial network.

5. A method of analyzing a sample, comprising:
   scanning one or more samples to collect a first plurality of sample images having a first image resolution;
   generating a defect list based on the first plurality of sample images;
   inputting images corresponding to the defect list into a neural network, the neural network being trained with source data including sample images having the first image resolution and sample images having a second image resolution higher than the first image resolution;
   generating a second plurality of sample images with the neural network based on the images corresponding to the defect list, the second plurality of sample images having the second image resolution and corresponding to the defect list;
   causing an inspection sub-system to perform automatic defect review at defect locations on the one or more samples to collect the sample images having the second image resolution, wherein the defect locations are identified based on the sample images having the first image resolution;
   training the neural network based on the source data including the sample images having the first image resolution and the sample images having the second image resolution;
   causing the inspection sub-system to perform automatic defect review at an identified defect location on the sample to collect a second sample image having the second image resolution when a first sample image having the first image resolution and corresponding to the identified defect location is an invalid input to the neural network; and
   retraining the neural network based on the first sample image having the first image resolution and the second sample image having the second image resolution.

6. The method of claim 5, wherein the second image resolution is 2 to 5 times the first image resolution.

7. The method of claim 5, wherein the first plurality of sample images are grayscale images, and the second plurality of images are color images.

8. The method of claim 5, wherein the neural network comprises a generative adversarial network.

9. A controller for a sample analysis system, comprising:
   at least one processor; and
   at least one memory medium communicatively coupled to the at least one processor, the at least one memory medium including program instructions that are executable by the at least one processor and configured to cause the processor to:
      generate a defect list based on a first plurality of sample images having a first image resolution;

input images corresponding to the defect list into a neural network, the neural network being trained with source data including sample images having the first image resolution and sample images having a second image resolution higher than the first image resolution;

generate a second plurality of sample images with the neural network based on the images corresponding to the defect list, the second plurality of sample images having the second image resolution and corresponding to the defect list;

cause an inspection sub-system to perform automatic defect review at defect locations on the one or more samples to collect the sample images having the second image resolution, wherein the defect locations are identified based on the sample images having the first image resolution;

train the neural network based on the source data including the sample images having the first image resolution and the sample images having the second image resolution;

cause the inspection sub-system to perform automatic defect review at an identified defect location on the sample to collect a second sample image having the second image resolution when a first sample image having the first image resolution and corresponding to the identified defect location is an invalid input to the neural network; and retrain the neural network based on the first sample image having the first image resolution and the second sample image having the second image resolution.

10. The controller of claim 9, wherein the second image resolution is 2 to 5 times the first image resolution.

11. The controller of claim 9, wherein the first plurality of sample images are grayscale images, and the second plurality of images are color images.

12. The controller of claim 9, wherein the neural network comprises a generative adversarial network.

* * * * *